United States Patent [19]

Londeck et al.

[11] Patent Number: 4,835,908
[45] Date of Patent: Jun. 6, 1989

[54] FRAMELESS GLASS SYSTEM FOR VEHICLE DOOR

[75] Inventors: Paul B. Londeck, Troy; Robert F. Sarti, Rochester; Jack R. Aho, Clawson, all of Mich.

[73] Assignee: General Motors Corporation, Detroit, Mich.

[21] Appl. No.: 228,205

[22] Filed: Aug. 4, 1988

[51] Int. Cl.⁴ .............................................. B60J 1/16
[52] U.S. Cl. ............................................ 49/377; 16/82
[58] Field of Search ............... 49/377, 414, 417, 423, 49/431, 436, 415, 316; 292/14, 70; 16/86 R, 86 A, 86 B, 86 C, 82

[56] References Cited

U.S. PATENT DOCUMENTS 2,069,219  2/1937  Conlon ................................. 49/377
2,848,272  8/1958  Storch ................................. 49/377

FOREIGN PATENT DOCUMENTS 0033518  2/1983  Japan ................................. 49/348
0326052  1/1958  Switzerland ........................ 49/377

Primary Examiner—Kenneth J. Dorner
Assistant Examiner—Gerald Anderson
Attorney, Agent, or Firm—William A. Schuetz

[57] ABSTRACT

A vehicle door assembly having an unframed window which can be readily adjusted to properly position the same in its up position during vehicle assembly. This positioning is accomplished by employing glass stabilizers and upstops which can be loosely slidably mounted on the door assembly and which are automatically moved and/or can be readily adjusted against a seal on the vehicle body when the window is raised and then tightened.

8 Claims, 2 Drawing Sheets

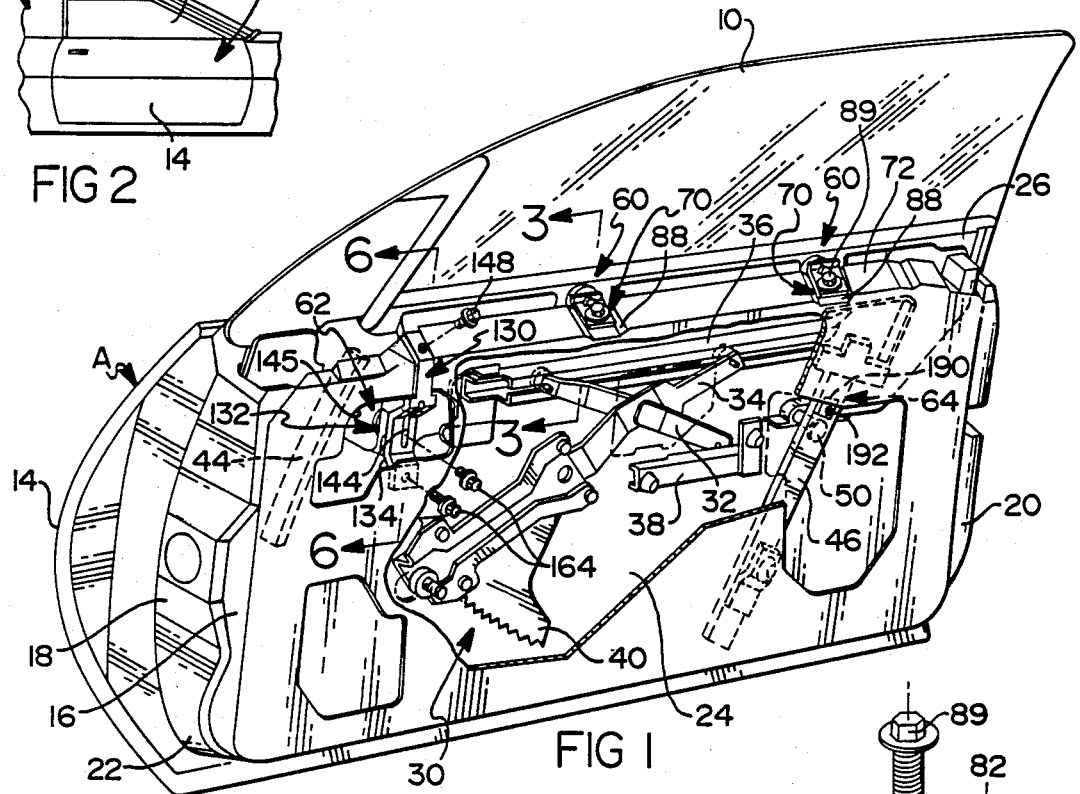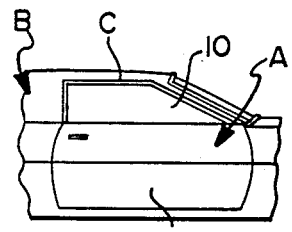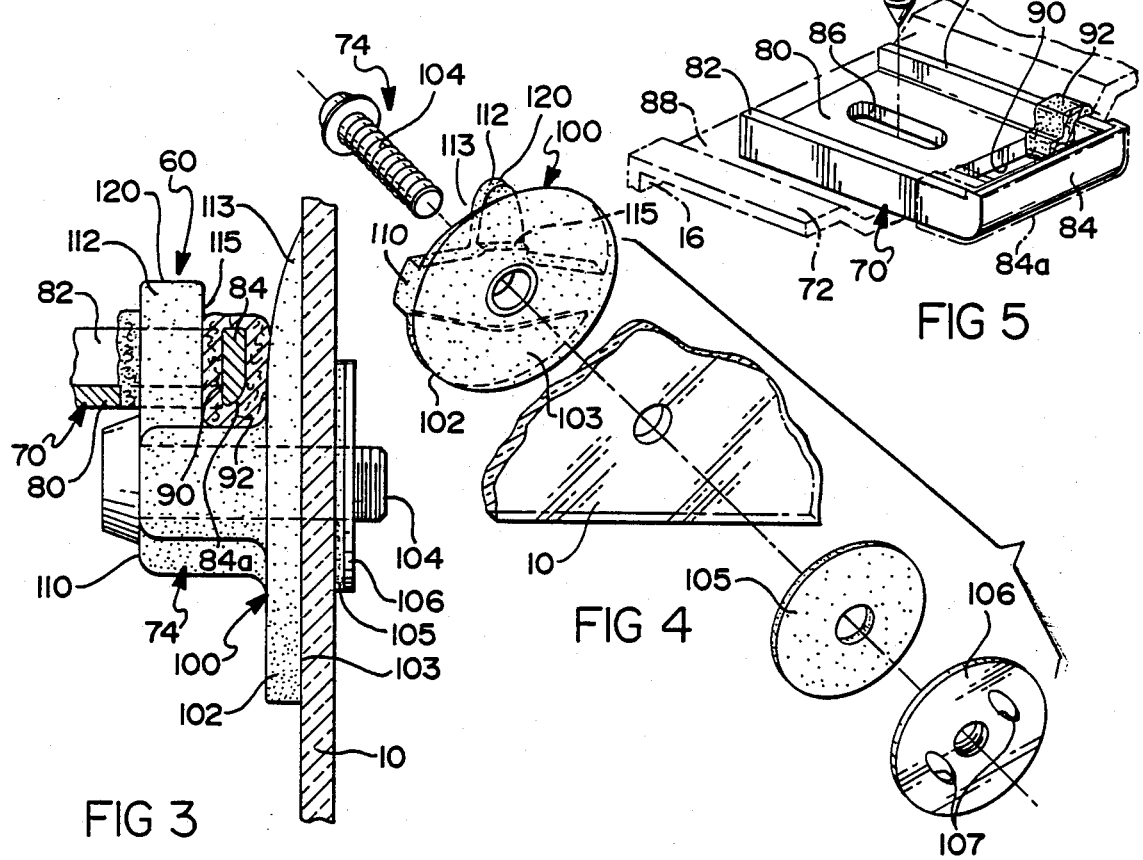

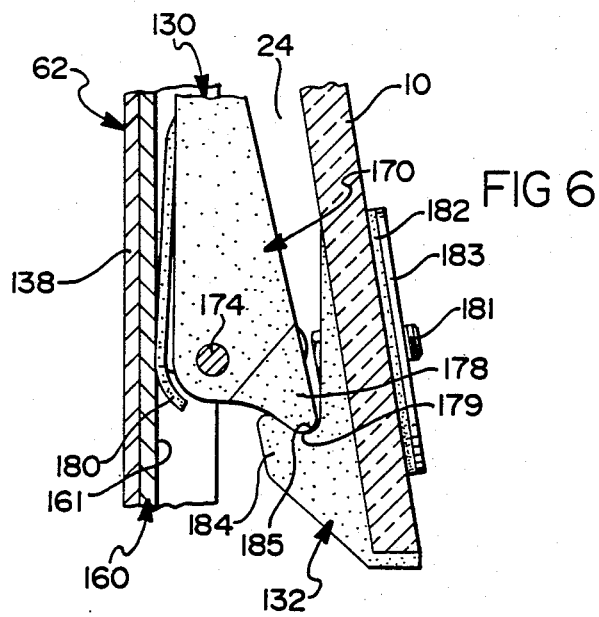
FIG 6
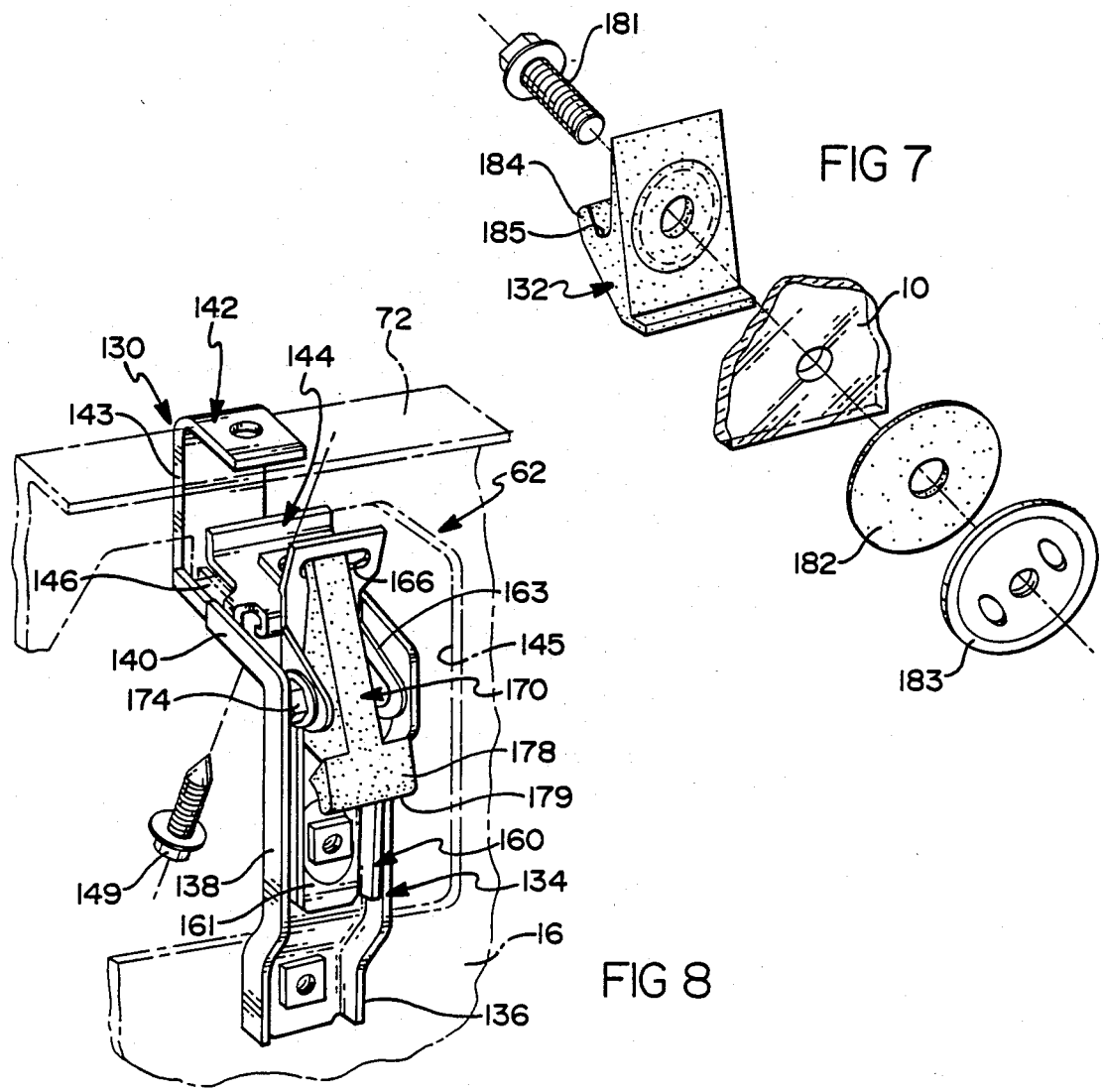
FIG 7
FIG 8

FRAMELESS GLASS SYSTEM FOR VEHICLE DOOR

The present invention relates to vehicle doors having an unframed movable window therein and, more particularly, to a vehicle door assembly having improved means for stabilizing the unframed window against movement when the latter is in its raised or closed position.

Vehicles, such as hardtop vehicles, usually have doors in which the movable window therein is unframed, i.e., there is no frame surrounding the sides and top edges of the window when it is raised. The unframed windows of these doors engage a stationary deflectable seal carried by the vehicle body surrounding the door opening in the vehicle when the window is raised and the door is closed. This type of door, however, requires proper adjustment of the window during vehicle assembly so that the window, when raised, is properly positioned to effectuate a good seal against the surrounding seal on the vehicle body. If the pressure engagement between the window and the seal is too little, leakage of water and/or air can occur which is objectionable. If the pressure engagement is too high, the friction between the glass and seal makes it difficult to raise and lower the window when the door is closed and results in undue seal wear.

In order to properly position an unframed window in its raised position, glass stabilizers mounted on the door adajacent its upper end or belt line and engageable with the opposite sides of the window and adjustable upstops mounted on the door and/or window guides in the door have been employed, the upstops being engageable by means on the window to limit the upward movement thereof. These glass stabilizers have either been made from a deflectable material or have comprised adjustably positionable members having a resilient or flocking material secured thereto which is engageable with the glass or window. While these prior stabilizers and stops have been satisfactory in use, if properly adjusted to properly position the window in its raised position, they nevertheless have the drawback of requiring a good deal of adjustment during vehicle assembly which is time consuming and, if not initially properly done, will require readjustment at a later date.

The present invention provides a vehicle door having an unframed window which can be readily adjusted to properly position the same during vehicle assembly. This is accomplished by employing novel glass stabilizers and an upstop which can be loosely slidably mounted on the vehicle door and which are automatically moved to their properly adjusted position or can be readily adjusted against the seal on the vehicle body when the window is moved to its raised position via a window regulator mechanism already assembled in the door and operatively connected with the window. When the window is so raised, the assembler need merely to tighten down on bolts in order to hold the stabilizers and upstops in their proper position. Once so positioned, the stabilizers and upstops will ensure that the window will always be properly positioned against the seal in its raised position. In addition, the novel stabilizers of the present invention provide increased stability for the window, when fully raised, by trapping the window against transverse movement and without the need for engaging both sides of the window.

Accordingly, it is an important object of the present invention to provide a new and improved vehicle door having a movable unframed window therein, and which includes stabilizer and upstop means to render the window highly stable when raised and which can be readily adjusted during vehicle assembly when the window is raised to properly position the window against a seal carried by the vehicle body to insure proper sealing between the window and seal.

Another object of the present invention is to provide a new and improved vehicle door having a movable unframed window therein, as defined in the next preceding object, and in which the window stabilizers include a catch which is mounted on one of the panels of the door closely adjacent its upper end and disposed transversely of the plane of the window and with the catch member having an opening therethrough located inwardly from its end nearest the window, and a latch member mounted on the window and with the latch member having a base abutting the window adjacent its lower end and an upwardly extending integrally formed finger spaced from the base and extending toward the catch member when the window is in an open position, and wherein the finger of said latch member is receivable within the slot of the catch member as the window nears its fully closed position whereby the catch member securely traps the window against transverse in and out movement when in its closed position.

A further object of the present invention is to provide a new and improved vehicle door having a movable unframed window therein, as defined in the preceding objects, and which includes an upstop means mounted on a door panel which is engageable by means carried by the window at its lower end to provide a stop to limit the upward movement of the window and in which the upstop means includes a plastic member pivotally mounted on the member for movement toward and from the plane of the window, the member having a rounded end which is biased into engagement with the adjacent side of the window by an integrally formed leaf spring so that it will always be engaged by the means on the window for limiting the upward movement of the window without the need for any in and out adjustment relative to the plane of the window.

Another object of the present invention is to provide a new and improved vehicle door having a movable unframed window therein, as defined in the next preceding object, and wherein the upstops means is slidably mounted on a bracket in the door so as to be adjustable up and down relative to the door and wherein the catch members are slidably mounted on the panel of the door for adjustment toward and from the window, and wherein said upstop means and said catch members are initially loosely mounted to said door so as to be slidable during assembly of the vehicle so that when the window is raised during assembly to its fully raised position, the latch member of the glass stabilizer engages the catch member and the means on the window engages the plastic upstop member to automatically slidably move the upstop means and the catch members to the final adjusted position of the window whereupon the assembler can tighten the catch members and the upstop means in place whereby the catch members and upstop means are automatically positioned so as to always position the window thereafter when fully raised in its proper position relative to the seal means on the vehicle body.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a perspective view of the novel vehicle door, with portions broken away, of the present invention;

FIG. 2 is a reduced fragmentary side elevational view of a vehicle embodying the novel door of the present invention and showing the door in its closed position;

FIG. 3 is an enlarged fragmentary, cross sectional view, with portions shown in elevation, taken along the lines 3—3 of FIG. 1;

FIG. 4 is an exploded view of various parts shown in FIG. 3;

FIG. 5 is an enlarged exploded view of part of the door shown in FIG. 1;

FIG. 6 is an enlarged fragmentary cross sectional view, with portions shown in elevation, taken along the lines 6—6 of FIG. 1;

FIG. 7 is an exploded view of various parts shown in FIG. 6; and

FIG. 8 is an enlarged perspective view of part of the vehicle door shown in FIG. 1.

The present invention provides a novel vehicle door or door assembly A having an unframed movable window 10 therein and in which the window 10 is highly stabilized against movement when in its raised or closed position. As shown in FIG. 2 of the drawings, the novel door assembly A is adapted to be pivotally mounted in a conventional manner to a vehicle body B for movement between open and closed positions. The unframed window 10 when the door assembly A is in its closed position, engages a seal or seal means C mounted on the vehicle body adjacent its door opening for the door assembly A and which is engageable by the window 10 along its top and side edges when the door assembly A is in its closed position to provide a seal between the unframed window 10 and the vehicle.

Referring to FIG. 1 of the drawings, the novel door assembly A comprises an outer door panel 14, an inner door panel 16, fore and aft end walls 18 and 20, respectively, and a bottom wall 22. The panel 16, end walls 18, 20 and bottom 22 comprise a one piece stamping and are suitably welded or secured to the outer panel 14 to define a well 24 for housing the unframed window 10 and other door components. The well 24 is open at its top to define an elongated slot 26 through which the window 10 can pass.

The door assembly A further includes a window regulator mechanism 30 for supporting the window 10 and which is carried by the inner door panel 16 of the door assembly A. The window regulator mechanism 30 could be of any suitable or conventional construction and will not be described in detail. Suffice it to say, that the window regulator mechanism 30 could be of a cross arm type having a pair of arms 32 and 34 whose upper ends are slidably connected via rollers within a sash channel 36 secured to the lower edge portion of the window 10. The lower end of the arm 32 is slidably received in a stationary channel 38 carried by the inner panel 16 and the lower end of the arm 34 is operatively connected with the sector gear 40 of the window regulator mechanism 30. As is well known to those skilled in the art, operation of the window regulator mechanism 30 in one direction causes the window 10 to be raised and in the other direction causes the window 10 to be lowered while at the same time the mechanism 30 supports the window at any position to which it is moved within the door.

The door assembly also includes a front guide 44 and a rear guide 46 secured to the inner panel 16 of the door. The front guide 44 would be a channel for receiving the front side edge portion of the glass or window 10 and the guide 46 would be a C-shaped channel for receiving a pin guide 50 extending transversely of the window 10 and secured adjacent its lower edge thereof. The guides 44 and 46 are adjustably positionable transversely between the inner and outer panels 16 and 14 of the door assembly A and control the path of movement of the window 10 between a raised or closed position, as shown by the solid lines in FIG. 1, in which a major portion of the window 10 is disposed above the slot 26 in the door assembly A and an open position (not shown) in which the window would be wholly received within the well 24 of the door assembly A. The guides 44 and 46, as is well known in the art, are adjustably positionable transversely within the door assembly A to effect movement of the window 10 through a path such that it will engage the seal C with the proper pressure to effectuate a good seal with the vehicle body.

In accordance with the provisions of the present invention, the novel door assembly A includes a pair of novel window stabilizers 60 carried in part by the window 10 and in part by the inner panel 16 adjacent the top opening 26 or belt line of the door assembly A and a novel front upstop means 62 carried by the inner panel 16 and the window 10. In addition the door assembly includes a conventional rear upstop 64. The stabilizers 60 and front upstop 62 serve to accurately position the unframed window 10 with respect to the door assembly A and the vehicle body B and to stabilize the unframed window 10 in its raised position.

The left and right stabilizers 60 shown in FIG. 1 are of an identical construction and therefore only the leftmost stabilizer 60, as shown in FIG. 1, will be described in detail. Referring to FIGS. 3–8, the stabilizer 60 comprises a catch member or means 70 which is carried by the inner panel 16 adjacent its transversely extending top end portion 72 (see FIG. 1) and which extends inwardly or transversely of the window 10, and a latch member or means 74 which is secured to the window 10 and which cooperably engages the catch means 70 when the window is in its raised position to stabilize it against in and out movement relative to the vehicle B. The catch means 70 comprises a stamped metal member having a planar base 80, upwardly extending sides 82 and an upwardly extending end portion 84 at one end thereof. The end portion 84 has a curved undersurface, as indicated by the reference numeral 84a. The catch member 70 has an elongated slot 86 extending through the base portion 80 and which is adapted to be disposed above an opening (not shown) through the transversely extending top portion 72 of the inner panel 16. As shown in FIG. 1, the top end portion 72 of the inner panel 16 is provided with depressions 88 to enable the catch members 70 to be positioned therein and be flush with the remainder of the top portion 72. The catch members 70 are adapted to be secured to the top flange 72 of the inner panel 16 via a bolt or screw 89. The catch members 70 are adjustably positionable toward and from the window 10, extends transversely thereof and has its end 84 being positioned adjacent the interior side of the window 10. The in and out adjustment is permitted by loosening the screw 89 and sliding the catch member toward and from the plane of the window. In addition the catch means is provided with a transverse slot 90 adjacent its end 84. The slot 90 has a side edge which is flush with the inner side of the end 84 and extends normal or transversely of the slot 86. In addition the catch members 70 are provided with a resilient or flocking material, as indicated by reference numeral 92, which is adhesively secured to the end 84 and which completely encapsulates the end 84 and portions of the sides 82 and which surrounds the side edges of the base portion 80 defining the slot 90.

The latch means 74 comprises a one piece plastic latch member 100 having a planar base 102 provided with a planar bottom 103 which is seated against the window 10 and secured thereto. The latch member 100 is secured to the window 10 by a bolt 104 which extends through aligned openings in the latch member 100, window 10, a resilient washer 105 and is threadably engaged with a planar nut 106. The nut 106 has a pair of tool engaging slots or openings 107 to enable it to be threadably secured to the bolt 104 and tightened against the glass 10 via the resilient washer 105.

The latch member 110 besides the base 102 has a boss portion 110 and an upwardly extending finger or ear 112 which is laterally spaced from the base portion 102. The base portion 102 of the latch member 100 has a tapered upper surface as indicated by reference numeral 113 to form a smooth transition from the glass or window 10 to the boss portion 110. The base 102, the boss portion 110 and the finger 112 define a trough or recess 115 for receiving the end 84 of the catch member 70 as will be explained hereinafter. The boss portion 110 provides rigidity for the latch member 110 and also serves to integrally support the upwardly extending finger 112. The finger 112 extends radially upwardly and has a rounded upper end 120. The transverse dimensions of the finger 112 are less than the transverse dimensions of the slot 90 in the catch member 70.

The front upstop means 62 comprises a latch means 130 carried by the inner panel 16 and a catch means 132 secured to the window 10 adjacent its lower front end, as viewed in FIG. 6. The latch means 130 comprises a generally U-shaped bracket 134, as viewed in cross section, and having a lower portion 136 which is adapted to be bolted to the inner panel 16, a vertically extending midportion 138 which has a planar bottom, and a generally U-shaped upper portion 140 having a bottom 143 and a top flange 142 which is bolted to a flange on the inner panel 16 via a bolt 148 (see FIG. 1). The midportion 138 has a vertically extending slot 141 extending through its bottom, as best shown in FIG. 1. The latch means 130 further includes a second bracket 144 for entrapping a flange 146 formed adjacent the top of an opening 145 in the inner panel 16, the opening 145 being located beneath the top portion 72, of the inner panel 16 and through which the upper portion 140 of the bracket 134 extends. The upper bracket portion 140 is secured to the upper end portion 72 of the inner panel 16 via the bolt 148 (see FIG. 1) and the bracket 144 is bolted to the bracket portion 140 via a suitable bolt 149 and with the flange 146 of the inner panel 16 being clamped therebetween. The brackets 134 and 144 thus provide a rigid brace or support extending across the gap or opening 145 in the inner panel 16.

The latch means 130 further includes a U-shaped bracket 160, as viewed in cross section, having a planar bottom 161 which is slidably received on the planar bottom 138 of the bracket 134. The bracket 160 is adapted to be secured to the midportion 138 of the bracket 134 via bolts 164 after its vertical position relative to the bracket 134 is determined. The bracket 160 also includes a pair of spaced slotted ears 163 and has a cut out 166 through its top end through which a plastic latch member 170 extends. The plastic latch member 170 is generally triangular in shape and is pivotally connected to the slotted ears 163 of the support bracket 160 via an attaching bolt 174. The upper end of the latch member 170 is engageable with the back side of the top of the bracket 160 adjacent the cut out 166 so to limit its movement clockwise about the pivot means 174, as viewed in FIG. 8. The triangular latch member 170 extends toward the window 10, as best shown in FIGS. 6 and 8 and has an integrally formed boot or foot 178 at its lower end. The boot or foot 178 has a rounded end 179. In addition, the latch 170 has an integrally formed curved leaf spring 180. The leaf spring 180 has one end formed integral with the back side of the latch member 170 and its other end in abutting engagement with the bottom 161 of the bracket 160. The leaf spring 180 biases the boot 178 of the latch member 170 toward and into engagement with the window 10.

The latch member 170 is adapted to be engaged by the catch means 132 mounted on the window 10. The catch means 132 comprises a plastic catch member which is adapted to be secured to the window 10 by a bolt 181. As best shown in FIG. 7, the bolt 181 extends through aligned openings in the catch member 132, the window 10, and a resilient washer 182 and is threadably engaged with a planar nut 183. The washer 182 and nut 183 are identical to washer 105 and nut 106 of the latch means 74 shown in FIG. 4. The catch member 132 includes a hook or projection 184 which is spaced laterally from the window 10 and extends upwardly toward the latch member 170. The hook 184 is located adjacent a rounded bottom recess 185 formed in the catch member 132 and the catch member 132 has a tapered base portion which tapers upwardly toward the window 10 so as to provide a smooth transition from the window 10 to the recess 185 in the catch member 132.

As noted before, the rear upstop means 64 is of a conventional construction and merely consists of an adjustable member 190 slidably received in the guide channel 46 and which can be secured thereto via a suitable bolt 192.

The operation of the window stabilizers 60 and the front upstop means 62 will be described with reference to a vehicle being assembled on the assembly line. The latch means 74 and the catch means 132 are mounted on the window 10 and in a manner hereinbefore described. The latch member 170 has its support base or bracket 160 only loosely mounted to the bracket 134 via the bolts 164 so that the bracket 160 can readily slide vertically up and down the bracket 134, but not become disassembled therefrom. The catch members 70 of the window stabilizers 60 are added later on.

When the door is mounted to the vehicle B, the operator can manipulate the window regulator mechanism 30 to move the window 10 towards its fully raised position. As the window is being raised towards its raised position, the catch member 132 will be moving toward the latch member 170 and the latch member 170 due to the integral spring 180 will have its boot 178 biased into engagement with the window 10. As the window 10 is raised the tapered portion of the catch member 132 will cam the latch member 170 toward the bottom 161 of the bracket 160 and in opposition to the biasing force of the spring 180. The latch member pivot bolt 174 can also slide in the slots in the slotted ears 163. When the boot 178 of the latch member is fully received in the recess 185 of the catch member 132 the latch member 170 and its associated support bracket 160 will be raised vertically.

When the window has moved to its fully raised position, the catch members 70 can be positioned in place and with the latch fingers 112 being received through the slots 90 in the catch members 70. The operator can then adjust the window 10 transversely of the door or in and out to properly position the window 10 in its up position and into correct pressure engagement with the seal means C. This is done primarily through in and out adjustment of the guide 46, as is well known in the art. After the window 10 is adjusted, the flocked end walls 84 of the catch members are slidably moved into engagement with the fingers 112 and the bolts 89 tightened down so that the catch members 70 will be properly positioned to at all times receive the fingers 112. At the same time, the operator will tighten down on the bolts 164 to tighten the base member 160 to the bracket 134 to properly position the upstop adjacent the front end of the window. At the same time the rear upstop 64 would be tightened in place and bolt 174 tightened to position the member 170 and retain it in place on the ears 163 of the bracket 160.

From the foregoing, it should be apparent that the front upstop is automatically adjusted in its proper up position by the structure provided and all that the operator has to do is make three tightening adjustments on the assembly line. Since the latch member 170 is at all times biased toward engagement with the window 10 once bolt 174 is tightened, it will always be properly positioned in and out relative to the window 10.

In addition, it should be noted that only a single adjustment on the assembly line has to be made to each of the stabilizers 60 when the window is in its raised position and that thereafter the window will be always positioned properly by the cooperation between the catch members 70 and the latch fingers 112. This cooperative engagement between the catch members 70 and the latch fingers 112 traps the window 10 against transverse movement in and out when in its up position and thus, provides for a greater stability of the window 10 in its raised position to insure proper sealing of the window 10 against the seal C at all times.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a vehicle door assembly having spaced inner and outer panels having upper ends defining a top slot between them through which a frameless window is movable between open and closed positions, a window regulator mechanism carried by the door assembly and operatively connected with the window to raise and lower the same along a path which is guided by a guide means disposed within the door assembly, an upstop means carried by said vehicle door assembly to prevent movement of said window past its raised position and window stabilizing means carried by the door assembly adjacent its top slot for engaging and stabilizing the window against transverse movement when in its closed position, the improvement being that said stabilizer means comprises a catch member which is mounted on one of said panels of said door assembly closely adjacent its upper end and disposed transversely of the plane of the window, said catch member having an opening therethrough located away from its end nearest the window, means for adjusting the mounting position of the catch member on said one panel toward or away from the window, a latch member mounted on the window adjacent its lower edge, said latch member having a base abutting said window and an upwardly extending integrally formed finger spaced from the base and extending toward the catch member when the window is in its open position, said finger of said latch member being receivable within said opening of the catch member as the window nears its fully closed position whereby the catch member securely traps the window against transverse in and out movement when in its closed position.

2. In a vehicle door assembly, as defined in claim 1, and wherein the catch member at its end nearest the window is curved and has cushioning material secured thereto which surrounds said end of said opening therethrough.

3. In a vehicle door assembly, as defined in claim 2, and wherein the latch member is made from a plastic material and the base portion has a tapered surface providing a smooth tapered transition from the window toward a boss portion integral with the base and the finger.

4. In a vehicle door assembly, as defined in claim 1, and in which the upstop means comprises a first bracket means carried by one of the door panels, a second bracket means which is adjustably mounted vertically relative to the support bracket, a plastic latch member pivotally supported by the second bracket means and spring biased by spring means toward a position to engage the inner surface of the window, and a catch member mounted on the window adjacent its lower end which is adapted to engage the lower end of the latch member and cause the latch member to pivot in opposition to the biasing force of said spring means as the window approaches its upper position and provides an upstop for the window.

5. In a vehicle door assembly, as defined in claim 4, and wherein said second bracket means is initially slidably mounted on said first bracket means so that said latch member of said upstop means is automatically movable to its proper upstop position when the window is initially moved to its uppermost position and then secured in place.

6. In a vehicle door assembly having spaced inner and outer panels having upper ends defining a top slot between them through which a frameless window is movable between open and closed positions, a window regulator mechanism carried by the door assembly and operatively connected with the window to raise and lower the same along a path which is guided by a guide means disposed within the door assembly, an upstop means carried by said vehicle door assembly to prevent movement of said window past its raised position and window stabilizing means carried by the door assembly adajacent its top slot for engaging and stabilizing the window against transverse movement when in its closed position, the improvement being that said upstop means comprises a first bracket means carried by one of the door panels, a second bracket means vertically slidable on said first bracket means, fastening means for securing said second bracket means to the first bracket means, a plastic latch member pivotally supported by the second bracket means, a leaf spring formed integral with said latch member and engaging said second bracket means for biasing said latch member toward a position to engage the inner surface of the window, and a catch member mounted on the window adjacent its lower end which is adapted to engage the latch member at its lower end and cause the latch member to pivot in opposition to the biasing force of said leaf spring as the window approaches its upper position and provide and upstop for the window, said second bracket means being initially loosely slidably mounted on said first bracket means by said fastening means and said latch member of said upstop means being automatically movable to its proper upstop position when initially moved to its uppermost position by the second bracket means sliding on the first bracket means and then tightening said fastening means to secure the second bracket means to said first bracket means.

7. In a vehicle door assembly having spaced inner and outer panels having upper ends defining a top slot between them through which a frameless window is movable between open and closed positions, a window regulator mechanism carried by the door assembly and operatively connected with the window to raise and lower the same along a path which is guided by a guide means disposed within the door assembly, an upstop means carried by said vehicle door assembly to prevent movement of said window past its raised position and window stabilizing means carried by the door assembly adjacent its top slot for engaging and stabilizing the window against transverse movement when in its closed position, the improvement being that said stabilizer means comprises a catch member which is adjustably mounted via fastener means on one of said panels of said door assembly closely adjacent its upper end and disposed transversely of the plane of the window, said catch member having an opening therethrough located inwardly from its end nearest the window, means for adjusting the mounting position of the catch member on said one panel toward and from the window, a latch member mounted on the window adjacent its lower edge, said latch member having a base abutting said window and an upwardly extending integrally formed finger spaced from the base and extending toward the catch member when the window is in its open position, said finger of said latch member being receivable within said opening of the catch member as the window nears its fully closed position whereby the catch member securely traps the window against transverse in and out movement when in its closed position, said fastener means comprising a bolt which extends through a second slot in said catch member, said catch member being initially loosely mounted to said panel and being slidably relative thereto when said window is initially raised to properly position said catch member on said panel and said fastener being tightened thereafter to mount the catch member in place, said upstop means comprising a first bracket means carried by one of the door panels, a second bracket means vertically slidable on said first bracket means, fastening means for securing said second bracket means to the frist bracket means, a plastic latch member initially slidably and pivotally supported by a bolt secured to the slotted sides of the second bracket means, a leaf spring formed integral with said latch member and engaging said second bracket means for biasing said latch member toward a position to engage the inner surface of the window, and a catch member mounted on the window adjacent its lower end which is adapted to engage the latch member at its lower end and cause the latch member to slide and pivot in opposition to the biasing force of said leaf spring as the window approaches its upper position when initially raised to provide an upstop for the window, said second bracket means being initially loosely slidably mounted on said first bracket means by said fastening means and said latch member of said upstop means being automatically movable to its proper upstop position when the window is initially moved to its uppermost position by the second bracket means sliding on the first bracket means and then tightening said fastening means to secure the second bracket means to said first bracket means and tightening said bolt to position and retain said latch member against sliding movement relative to said second bracket means while still allowing pivotal movement relative thereto.

8. In a vehicle door assembly, as defined in claim 7, and wherein the catch member at its end nearest the window is curved and has cushioning material secured thereto which surrounds said end of said opening therethrough.

* * * * *